July 28, 1953  H. E. McCORD  2,646,619
BUSHING REMOVER TOOL
Filed Aug. 14, 1950
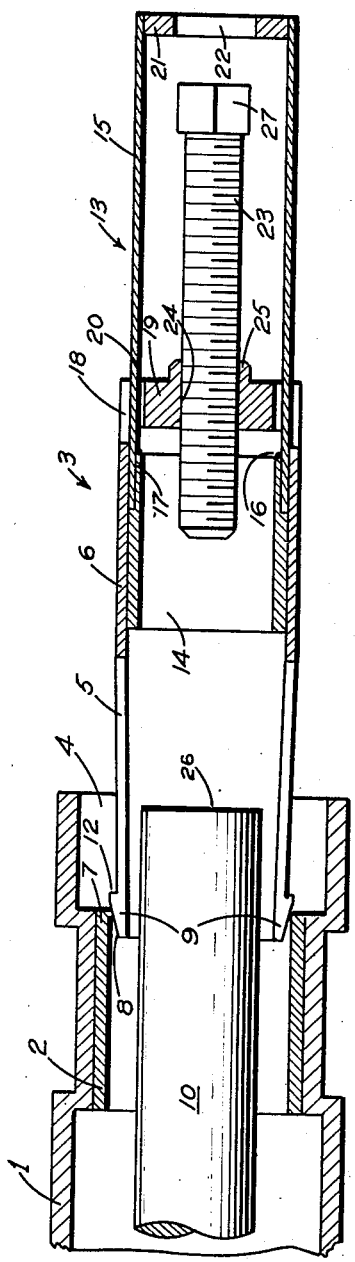
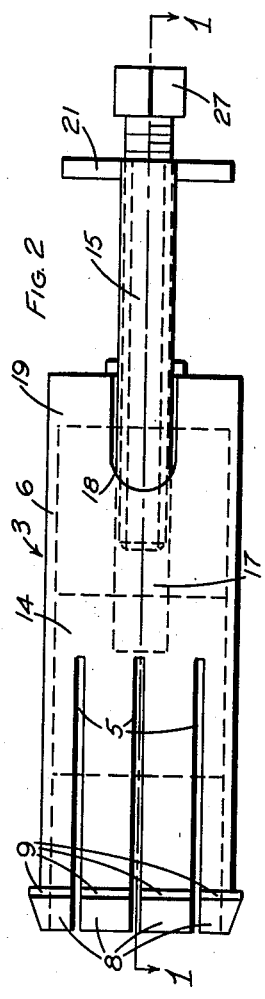
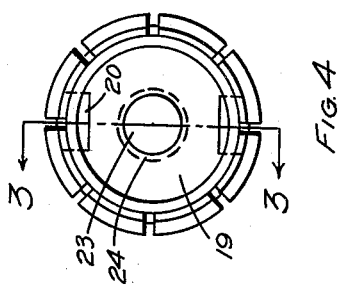
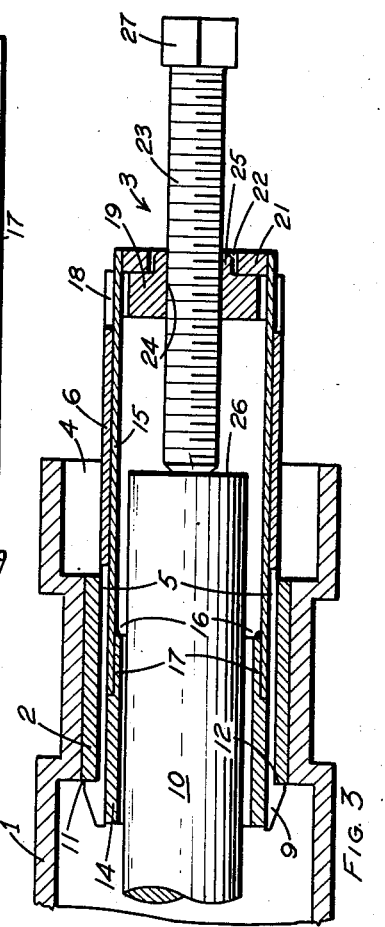
INVENTOR.
BY *Hester E. McCord*

Patented July 28, 1953

2,646,619

UNITED STATES PATENT OFFICE 2,646,619

BUSHING REMOVER TOOL

Hester E. McCord, Toccoa, Ga.

Application August 14, 1950, Serial No. 179,290

3 Claims. (Cl. 29—263)

This invention relates to a special class of tools for removing pressed fit bushings, collars, etc., from an internal seat in a housing or tube which contains a shaft or stationary member therein.

The primary object is to provide an improved structure for such a tool.

Another object of this invention is to provide an improved tool which is simple and inexpensive to make and which performs its task in a minimum of time.

Another object is to provide a bushing remover tool which includes a collet body which collapses at one end to pass thru the bushing and then expands to grab the bushing at its far side.

Still another object is to provide a tool of this type which employs a collet body with a slit end which can not expand after insertion thru the bushing to a greater diameter than required to pull the bushing.

A further object is to provide a tool which includes a collapsible collet which is inserted in a housing to pull a bushing therefrom by means of a pull screw acting against the housing shaft, and in which the screw starts pulling the bushing immediately upon engaging the shaft.

A still further object is to provide a tool of this type in which the locking ring which holds the collet in place beyond the bushing does not extend beyond the far end of the collet so that the tool may be used in places with very little clearance beyond the bushing.

Another object is to provide a collet body for a tool of this type which is slotted at one end to provide dogs for collapsing and engaging the back side of the bushing.

A further object is to provide a tubular locking ring for the collet body of a tool of this type which is instantaneously latched in place, and instantaneously retracted when the bushing removal has been accomplished.

An additional object is to provide a locking ring structure for a tool of this type which also acts as a centering piece to permit the pull screw to act axially with the center shaft and to permit the dogs to exert a balanced pull on the bushing.

In the drawings:

Fig. 1 is a sectional elevation of the bushing remover tool in a position preparatory to entering a bushing for removal; the tool section therein taken along the lines 1—1 of Fig. 2.

Fig. 2 is a top view of the complete bushing remover tool with its locking ring in an intermediate position.

Fig. 3 is a sectional elevation of the bushing remover tool in position to remove a bushing; the tool section therein taken along the lines 3—3 of Fig. 4.

Fig. 4 is a left end view of the bushing remover tool in Fig. 2.

Referring now to the drawing, 1 represents the housing which contains the bushing 2 which is to be removed by the bushing remover tool of the instant invention. The tool, indicated generally at 3, is being inserted, in Fig. 1, into center opening 4 of housing 1 and into the bushing 2, which causes the dogs 5 of collet body 6 to collapse under pressure of the outer end 7 of bushing 2 against the tapered portion 8 of the enlarged head 9 of dogs 5, due to manual pressure against the rear of tool 3. When these dogs have collapsed until their outside maximum diameter is smaller than the inside diameter of bushing 2, then additional manual pressure causes tool 3 to slide thru bushing 2 to the position shown in Fig. 3.

It will be recognized that in order for this tool to operate, the housing containing the bushing to be removed must also include an axial shaft or other stationary member therein. This is the condition present in the overdrive housing of certain present day vehicles. The shaft in this instance is represented by numeral 10.

When the tool 3 is in position (Fig. 3) to remove the bushing 2, the dogs 5 will have snapped back to their normal position and in such position will shoulder, by means of vertical shoulder 12, against the inner end 11 of bushing 2. The locking ring structure 13 shown retracted in Fig. 1 has been manually moved into place in Fig. 3 by a simple quick push. This structure 13 consists of a cylindrical lock ring 14 to which two guide straps 15 have been welded at 16 after insertion in a lap joint indicated at 17. These guide straps extend thru slots 18 at each side of collet body 6 near its head piece or plate 19 and ride in grooves 20 cut in head plate 19 adjacent the slots. The outer ends of straps 15 are then welded or otherwise secured to an end piece 21. This end piece 21 includes a hole 22 to permit the end piece and its attached locking ring structure to pass over pull screw 23 which is threaded thru tapped hole 24 of head plate 19 when the locking ring structure 13 is pushed into the position shown in Fig. 3. In this position, lock ring 14 is beneath the end 11 of bushing 2 and is in snug relationship with the inner diameter of the dogs 5 of the collet body 6; also the hole 22 of end piece 21 is positioned over boss 25 of head plate 19. Boss 25 thus serves to align locking ring structure 13, and structure 13 being rigid with lock ring 14 which is cylindrical and fits snugly within dogs 5 serves to center the tool 3 within the bushing and housing so that pull screw 23 will impart an axial force against shaft 10, and the shoulders 12 of dogs 5 will exert a balanced pressure around end 11 of bushing 2.

To remove the bushing 2, the pull screw 23 is tightened by hand thru threaded hole 24 until it abuts the exposed face 26 of shaft 10. A wrench is then applied to the square head 27 of screw 23 and the screw is tightened further. Since screw 23 can no longer advance due to the presence of face 26, which prevents any further movement, the head plate 19 moves slowly outward from the housing due to its threaded hole 24 advancing on screw 23. This action of head plate 19 causes dogs 5 which are rigid therewith to apply a pulling force thru their shoulders 12 against the end 11 of bushing 2. Continued tightening of screw 23 will completely remove bushing 2 from the housing 1. Since lock ring 14 is in place within dogs 5, there is no possibility of the dogs collapsing under the pulling force. When the bushing 2, now contained on tool 3, is removed from the housing, it may be released from the tool by retracting the lock ring structure 13 and then sliding the bushing along collet body 6 and beyond head plate 19 and end piece 21 and thus off the tool.

It will be seen that this tool requires a clearance only equal to the length of raised head 9 of dogs 5, as no part of the tool needs to be inserted further than required for shoulder 12 to engage end 11 of the bushing.

It will also be observed that locking ring structure 13 may be instantaneously inserted or retracted, and that by the use of the lock ring the tool is self-centering. A fine thread on the pull screw 23 permits tremendous pressures to be exerted on the shaft and consequently on the bushing as a removing force, but only a small force is exerted on the lock ring so that the entire locking ring structure may be of light weight and inexpensive material. Head piece 19, on the other hand, is subjected to additional forces than the remainder of the collet body, and it must consequently be much thicker in cross section.

From the foregoing description it will be readily seen that there has been produced a device which substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

I claim:

1. A bushing remover tool comprising a generally cylindrical tubular body with collapsible jaws at one end of the body, a locking ring structure including a cylindrical lock ring operating within the tubular body in close sliding relationship thereto, slots in the side of the tubular body, and guide straps attached to the lock ring and extending thru the slots to the outside of the body, a head piece at the other end of said body, an adjustable pull screw threaded thru said head piece, an end piece attached to the end of said guide straps outside the body, a central hole in said end piece, a raised boss on said head piece, said end piece adapted to be manually moved lengthwise of said screw in surrounding relation thereto and into and out of engagement with said raised boss to thereby center and adjust the position of the lock ring within the body to prevent or permit collapsing of the jaws of the body as desired.

2. A bushing remover tool for removing a bushing seated internally in a housing including a shaft centrally thereof and terminating in the vicinity of the bushing, comprising a tubular collet body, slits at one end of said body forming dog members therebetween, a raised and tapered head on said dog members at their free end, a substantially vertical shoulder on said head; said dog members collapsing sufficiently to pass thru the bushing when said tapered head is pressed against the bushing, said dog members springing back to their normal diameter when their raised head has passed completely thru the bushing, said shoulder abutting one end of said bushing when the dog members are in this position; a head piece at the other end of said body, a pull screw threaded thru said head piece and adapted to act between said head piece and said shaft to apply pressure to said collet body to pull both the bushing remover tool and the bushing from the housing in an axial direction with respect to said bushing; a locking ring structure comprising a cylindrical lock ring operating within the tubular body in close sliding relationship thereto, slots in the side of the tubular body, grooves in said head piece, guide straps attached to the lock ring and extending thru the slots and grooves to the outside of the body, an end piece connecting the outside ends of said straps, a hole in said end piece to permit said locking ring structure to be moved lengthwise of said pull screw in surrounding relation thereto so that the position of the lock ring may be manually adjusted externally of the body to permit or prevent collapse of said dog members.

3. A bushing remover tool for removing a bushing seated in a housing containing an axial shaft, including a generally cylindrical tubular body with collapsible jaws at one end thereof, a head plate at the other end thereof, a locking ring structure comprising a hollow cylindrical lock ring of substantial length operating within the tubular body in close sliding relationship thereto, a pull screw threadedly engaging said head plate and extending into said body and adapted to engage said shaft and pull said bushing and body from said housing, slots in the side of the tubular body, and guide straps attached to the lock ring and extending through the slots to the outside of the body so that the lock ring may be quickly manually inserted in position within the collapsible jaws from externally of the body, said straps spaced in parallel relation to and at the sides of said pull screw, and an end piece attached to the external ends of said guide straps adapted to abut said head plate during removal operation.

HESTER E. McCORD.

References Cited in the file of this patent

UNITED STATES PATENTS

| Number | Name | Date |
|---|---|---|
| 1,494,386 | Smith et al. | May 20, 1924 |
| 1,654,310 | Reiter | Dec. 27, 1927 |
| 1,728,248 | Naggy et al. | Sept. 17, 1929 |

FOREIGN PATENTS

| Number | Country | Date |
|---|---|---|
| 427,850 | Germany | Apr. 15, 1926 |